United States Patent [19]

Bishop et al.

[11] Patent Number: 4,865,671
[45] Date of Patent: Sep. 12, 1989

[54] PREPRESS APPARATUS AND METHOD

[75] Inventors: Roger B. Bishop, Toledo; Charles E. Ash, Perrysburg, both of Ohio; Siegfried H. Herliczek, Petersburg, Mich.

[73] Assignee: Libbey-Owens-Ford Co., Toledo, Ohio

[21] Appl. No.: 183,528

[22] Filed: Apr. 15, 1988

Related U.S. Application Data

[63] Continuation of Ser. No. 816,901, Jan. 7, 1986, abandoned.

[51] Int. Cl.$^4$ .............................................. C03C 27/10
[52] U.S. Cl. ..................................... 156/104; 156/286
[58] Field of Search ............... 156/104, 286, 582, 102; 100/155 G, 211, 155 R, 160, 168; 198/857; 269/21

[56] References Cited

U.S. PATENT DOCUMENTS

| | | | |
|---|---|---|---|
| 2,729,581 | 1/1956 | Pascoe et al. | 156/582 X |
| 2,948,645 | 8/1960 | Keim | 156/104 |
| 2,983,635 | 5/1961 | Richardson | 156/102 X |
| 2,990,305 | 6/1961 | Richardson | 269/21 X |
| 3,249,479 | 5/1966 | Boicey | 156/83 |
| 3,669,808 | 6/1972 | Klotzbach et al. | 156/582 |
| 3,729,088 | 4/1973 | Stein et al. | 198/857 X |
| 3,933,552 | 1/1976 | Shumaker | 156/104 |
| 4,040,888 | 8/1977 | Soska et al. | 156/582 X |
| 4,327,634 | 5/1982 | Colmon et al. | 100/155 G |
| 4,398,979 | 8/1983 | Cathers et al. | 156/87 |
| 4,624,731 | 11/1986 | Ash et al. | 156/104 X |

*Primary Examiner*—Raymond Hoch
*Attorney, Agent, or Firm*—Marshall & Melhorn

[57] ABSTRACT

A method for prepressing an assembly of stacked, superimposed glass and plastic sheets for subsequent autoclave lamination to provide a glazing. The apparatus includes a frame positioned between a delivery conveyor and a discharge conveyor and carrying prepress and support rollers. An assembly arrives on the delivery conveyor and is aligned and rotated ninety degrees before entry into the frame. The prepress rollers are rotatably mounted in pairs and attached to air cylinders which retract the rollers during entry to clear a vacuum ring which extends about the peripheral edge of the assembly such that a vacuum can be drawn on the assembly during the application of pressure and then extend the rollers into contact with an upper surface of the assembly to apply pressure thereto. The assembly is supported from its bottom side by the support rollers which are rotatably attached to the frame are located on either side of a plurality of drive rollers which are rotatably attached to the frame in pairs. The drive rollers are of different diameters and are adjustably mounted on an axis of rotation which is tilted from the horizontal path of the assembly. The drive rollers are driven to move the assembly through the frame while the prepress rollers apply pressure to the assembly. The different diameters and the tilted axis of rotation compensate for different lengths of the paths of travel of the drive rollers along the surface of assemblies of curved or bent sheets.

8 Claims, 3 Drawing Sheets

PREPRESS APPARATUS AND METHOD

BACKGROUND OF THE INVENTION

The present invention relates generally to the production of laminated glass sheets and, more specifically, to an improved apparatus for prepressing anti-lacerative or laceration shield type glazings particularly adapted for use in automotive vehicles.

In the early stages of the automobile industry, single sheets of ordinary glass were employed as windshields. As it became evident that this type of windshield presented a considerable safety hazard, the single sheets of ordinary glass were replaced with single sheets of heat treated or tempered glass. Thereafter, as laminated safety glass was developed to reduce the severity of lacerative injuries, its use in automotive windshields greatly increased until today, when almost all automotive windshields are constructed of some type of laminated glass.

Typically, laminated glass of the type utilized in vehicle windshields consists of two sheets of glass bonded together with a thin plastic interlayer, such as a sheet of polyvinyl butyral, for example. In the event of an impact on a laminated glass windshield sufficient to break the glass, the plastic interlayer functions to bind the glass fragments together, thus reducing the risk of injury to a driver or passenger as a result of flying glass or contact with the windshield. Further developments with this type of laminated glass, such as those disclosed in U.S. Pat. No. 3,231,461, have resulted in laminated windshields with improved penetration resistance. Consequently, with the ever growing recognition of the necessity for increased safety precautions, continuing efforts have been and are still being made to appreciably reduce the injury producing potential of automobile windshields.

Recently, it has been found that the addition of a second plastic layer bonded to the inner glass surface of the laminated windshield further increases the safety effectiveness of the windshield. This second plastic layer has typically been termed a protective laceration inhibiting shield since it has been found that the additional plastic layer will appreciably reduce the number and severity of lacerative injuries to persons thrown against the windshield under all impact conditions. Further, it has been found that the laceration shield, when produced under certain conditions of manufacture, improves the ability of the laminated windshield to decelerate movement of a person thrown against the windshield, while also increasing the penetration resistance of the windshield as compared to conventional laminated windshields. Also, the laceration shield reduces the amount of flying glass and thus the injury to car occupants as a result of objects that may be thrown against the windshield from overpasses or elsewhere outside the vehicle.

An example of an automotive windshield which incorporates, as part of its laminated structure, a protective laceration shield bonded to its inboard glass surface is disclosed in U.S. Pat. No. 4,242,403. In this patent, the laceration shield includes a penetration resisting multi-layer body consisting of an inner layer of relatively soft, extensible plastic material such as polyvinyl butyral, for example, which is adhered to the inboard surface of the windshield, an intermediate layer of more durable plastic such as polyester, and an outer coating of an abrasion resistant material.

While the effectiveness of a laminated windshield having a laceration shield is obvious, very few vehicles utilize such a windshield. The chief reason for this limited use has been the difficulty experienced in trying to manufacture a windshield with a laceration shield on a production basis. In the automotive industry, the standard for windshields is very high, especially as to optical qualities, and it has been very difficult to manufacture a windshield having a laceration shield which is free of optical defects. Even when the individual sheets of the laminated assembly are free from optical defects before bonding them together, it is difficult to join them and preserve the optical qualities.

One method for applying a plastic layer to one surface of a single sheet of glass is disclosed in U.S. Pat. No. 3,806,387. In this method, a sheet of glass, a layer of adhesive, and a layer of thin transparent plastic sheeting are assembled in a stack to produce an assembly for subsequent lamination. A second sheet of glass (called a glass cover or forming sheet) conforming to the configuration of the sheet of glass in the stacked assembly is then placed on top of the platic sheet. The surface of the glass forming sheet which is placed adjacent the plastic sheet is coated with a demolding agent to prevent any adhesion between the glass forming sheet and plastic sheet. Typically, the glass forming sheet is bent on the same form as the glass sheet of the laminated assembly. Next, the spaces between the individual laminae are evacuated and the assembly is positioned in an autoclave. The autoclave applies pressure to the exterior surfaces of the assembly while heating the assembly to a temperature which causes bonding between the glass sheet and the plastic sheet. After the assembly is removed from the autoclave, the forming sheet can be removed from the stack.

One cause of defects in laminated glass structures is air trapped between the layers. It has been found to reduce such defects if, prior to treatment in the autoclave, the assembly is pressed, or subjected to vacuum at its edges, or both. The preliminary pressing, or "prepressing" operation, is typically performed by an apparatus having upper and lower series of pressing or nipper rollers arranged in axially parallel, tangentially contacting relation. Generally, the rollers are mounted in a cage or frame adapted to be swung arcuately from an assembly receiving position to an assembly discharge position. It has also been found advantageous to apply a peripheral evacuation chamber less in thickness than the assembly to which it is attached enabling the evacuation chamber and assembly to pass between the prepressing rollers. Such an apparatus is disclosed in U.S. Pat. No. 4,040,888.

One of the problems with the prior art evacuation chamber was that it required a thin flexible tape of air impervious material to seal the evacuation chamber to the laminated assembly. Then, when the prepressing was completed, the tape had to be stripped from the laminated assembly. All of this taping required time and manual labor and left a sticky residue of adhesive on both surfaces of the laminated glazing. Furthermore, the use of the rigid tubes made processing curved assemblies extremely difficult and required the nipper rollers to be positioned a fixed distance apart less than that which would enable the most efficient prepressing operation.

SUMMARY OF THE INVENTION

Accordingly, it is an object of the present invention to provide a prepressing apparatus which allows the use of a conventional vacuum ring on assemblies to be laminated including a curved glass sheet or sheets.

It is another object of the present invention to provide an apparatus for prepressing assemblies to be laminated which automatically adjusts to the changing curvature of the plies as the assembly passes through the pressing rollers.

BRIEF DESCRIPTION OF THE DRAWINGS

The above as well as other objects of the invention will become apparent to one skilled in the art from reading the following detailed description of a preferred embodiment of the invention when considered in the light of the attached drawings, in which.

DESCRIPTION OF THE PREFERRED EMBODIMENT

Figure 1:
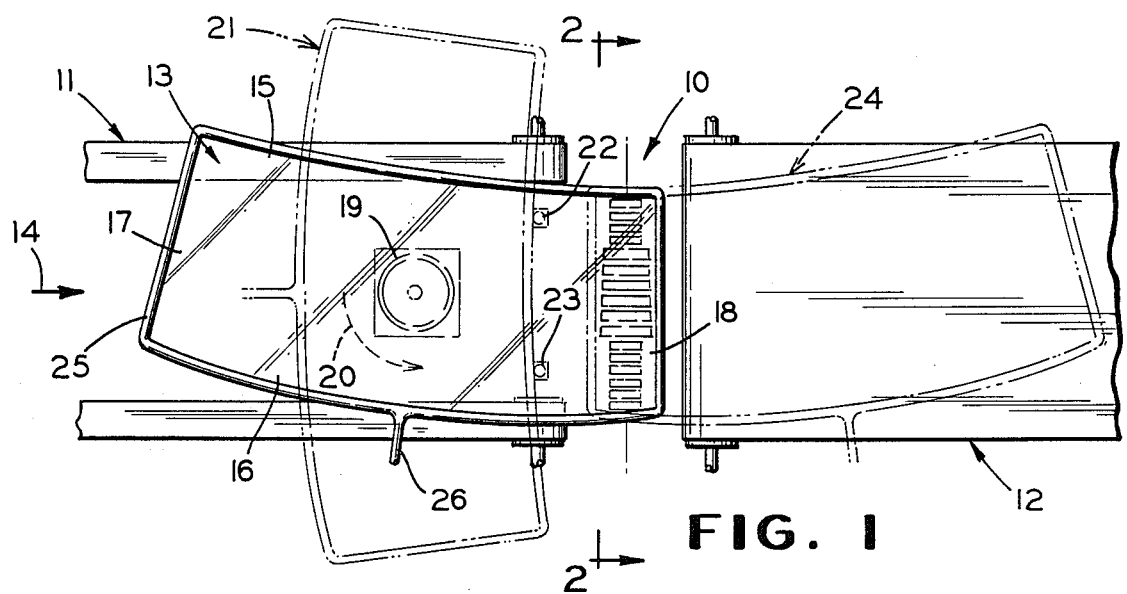
FIG. 1 is a diagrammatic top plan view of a prepressing apparatus in accordance with the present invention with the upper prepress rolls removed and showing an assembly in three different positions as it passes through the prepressing apparatus.

Referring to FIG. 1, there is shown a portion of a production line for laminating sheet assemblies including a prepressing apparatus 10 located between a delivery or entry conveyor 11 and a take-off or discharge conveyor 12. Assemblies to be laminated, such as the assembly 13, travel along the production line in the direction of the arrow 14. These assemblies are typically in the form of glass and plastic sheets arranged in a sandwich-like stack.

With reference to the assembly's ultimate orientation, after lamination thereof, in a vehicle, the assembly 13 has an upper edge 15, a lower edge 16, and side edges 17 and 18. The stacked assembly 13 is delivered to the prepressing apparatus 10 on the delivery conveyor 11 which includes a parallel pair of driven belts defining an opening between them. The assembly 13 is supported along its downwardly facing surface by the belts, with the upper edge 15 being the leading edge.

The assembly 13 of superimposed stacked sheets approaches the prepressing apparatus 10 with the upper edge 15 and the lower edge 16 generally transverse to the direction of travel 14 of the conveyor 11. When the upper edge 15, which is the leading edge of the assembly 13 in FIG. 1, approaches the prepressing apparatus 10, the assembly 13 is generally centered over a rotator cup 19 which is positioned between the delivery conveyor belts. This position of the assembly 13 is shown in phantom line and designated by the reference numeral 21. A pair of spaced apart aligning arms 22 and 23 are located between the belts of the conveyor 11 to engage the upper edge 15 of the assembly 13 and stop it over the rotator cup 19. The rotator cup 19 is raised into contact with the lower face of the assembly 13 and the arms 22 and 23 are retracted. The cup 19 is rotated in the direction of the arrow 20 through an approximate ninety degree arc to position the side edge 18 of the assembly 13, as shown by the solid line, between the spaced apart upper and lower pressing rollers (only the lower rollers being shown in FIG. 1 for the sake of clarity). The cup holds the assembly by vacuum and then releases and retracts when the upper rollers are lowered into pressure engagement with the assembly as will be hereinafter more fully described. The assembly 13 is then moved through the prepressing apparatus 10 and onto the discharge conveyor 12 in the discharge position shown by the phantom line 24.

Figure 3:
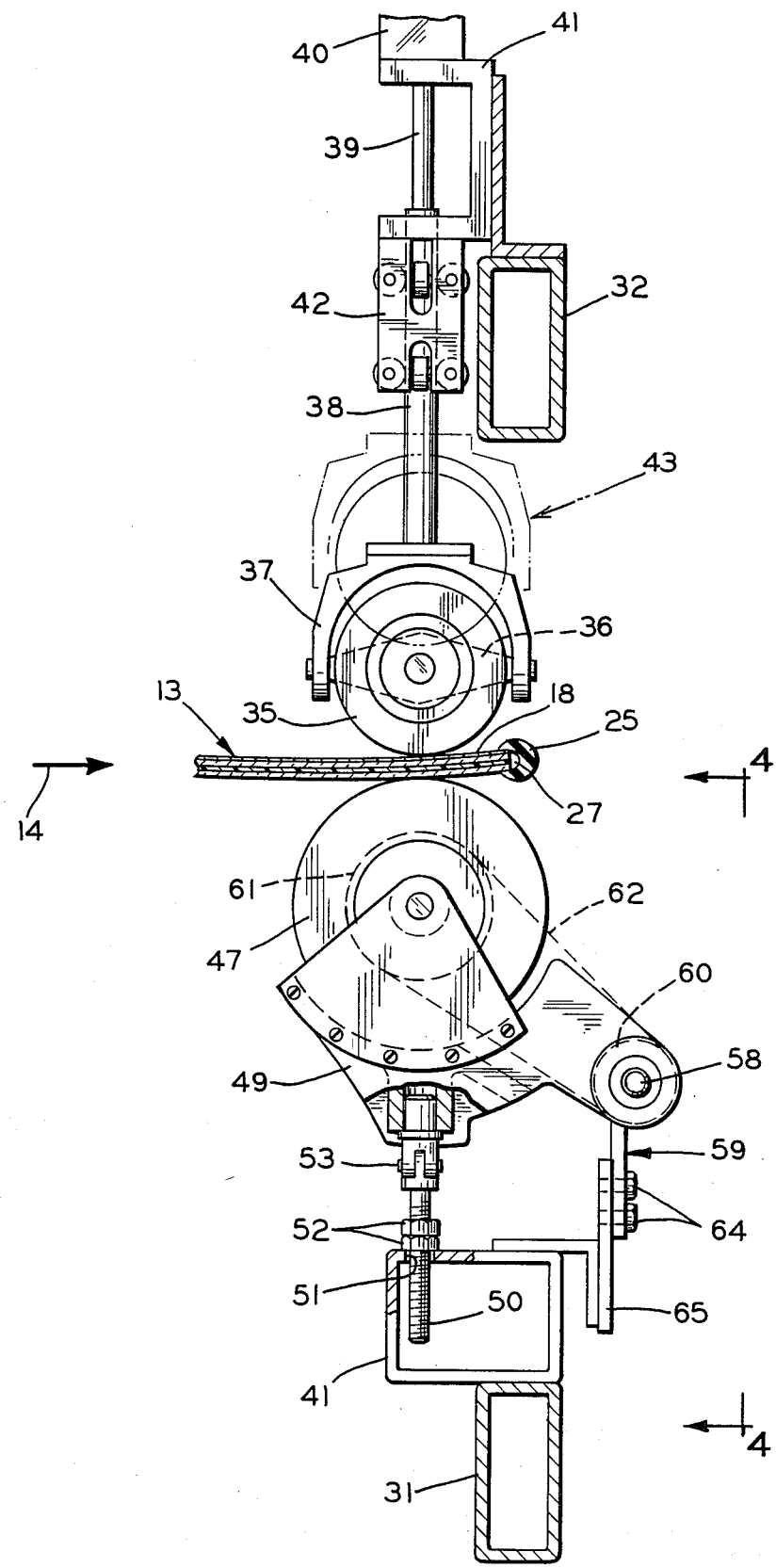
FIG. 3 is a cross-sectional view of the prepressing apparatus taken along the line 3—3 of FIG. 2 and increased in scale and showing the upper rollers in pressure engagement with the assembly.

During the prepressing operation and during the approach to and movement away from the prepressing apparatus 10, an evacuation or vacuum ring 25 remains attached about the peripheral edge of the assembly 13. The vacuum ring 25 is connected to a source of vacuum (not shown) by a connector hose 26. During the prepressing operation, a vacuum is drawn on the ring in order to assist in the evacuation of air from between the adjacent sheets in the assembly 13. As best shown in FIG. 3, the vacuum ring 25 is generally C-shaped in cross section with the opening slightly smaller in width than the thickness of the assembly 13 to provide an air tight seal. The vacuum ring 25 and the edges of the assembly 13 form a vacuum chamber 27 which is in communication with the entire periphery of the assembly 13 and the connector hose 26.

Figure 2:
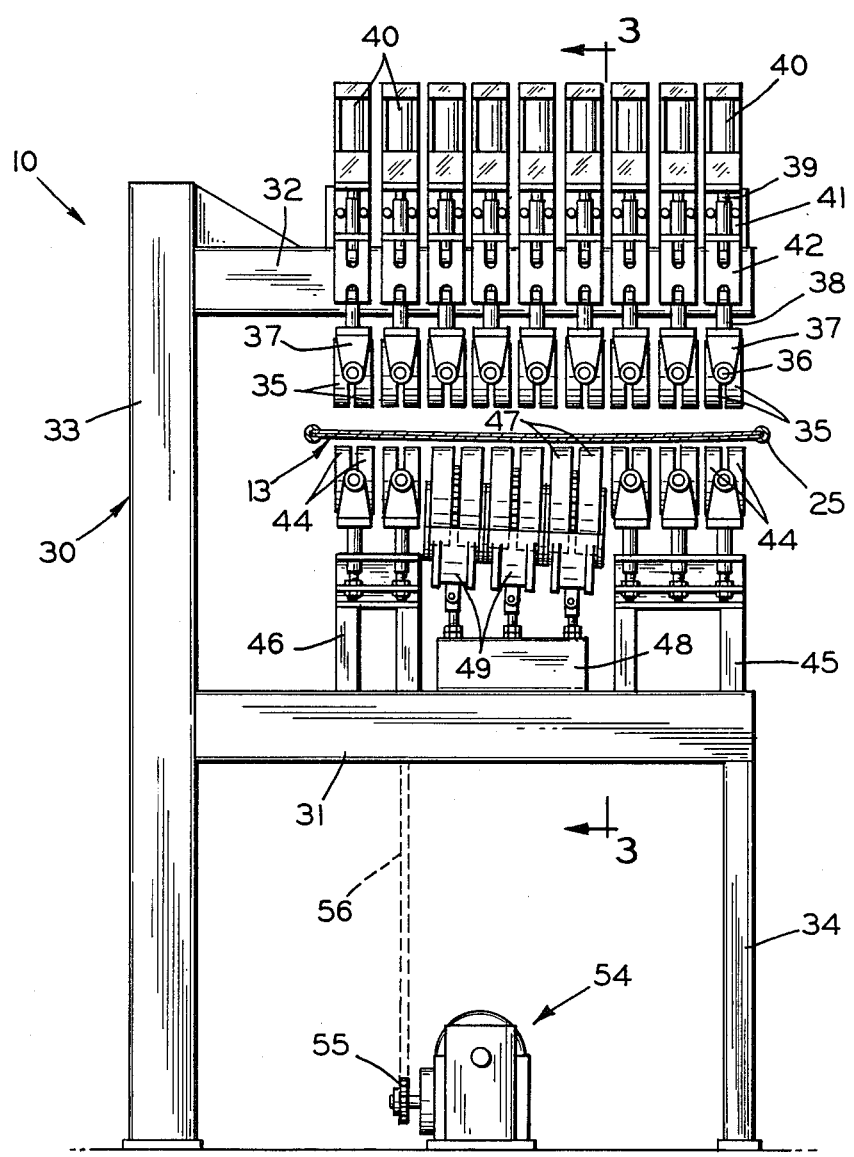
FIG. 2 is a front elevational view of the prepressing apparatus shown in FIG. 1 taken along the line 2—2 of FIG. 1 and increased in scale.
Figure 4:
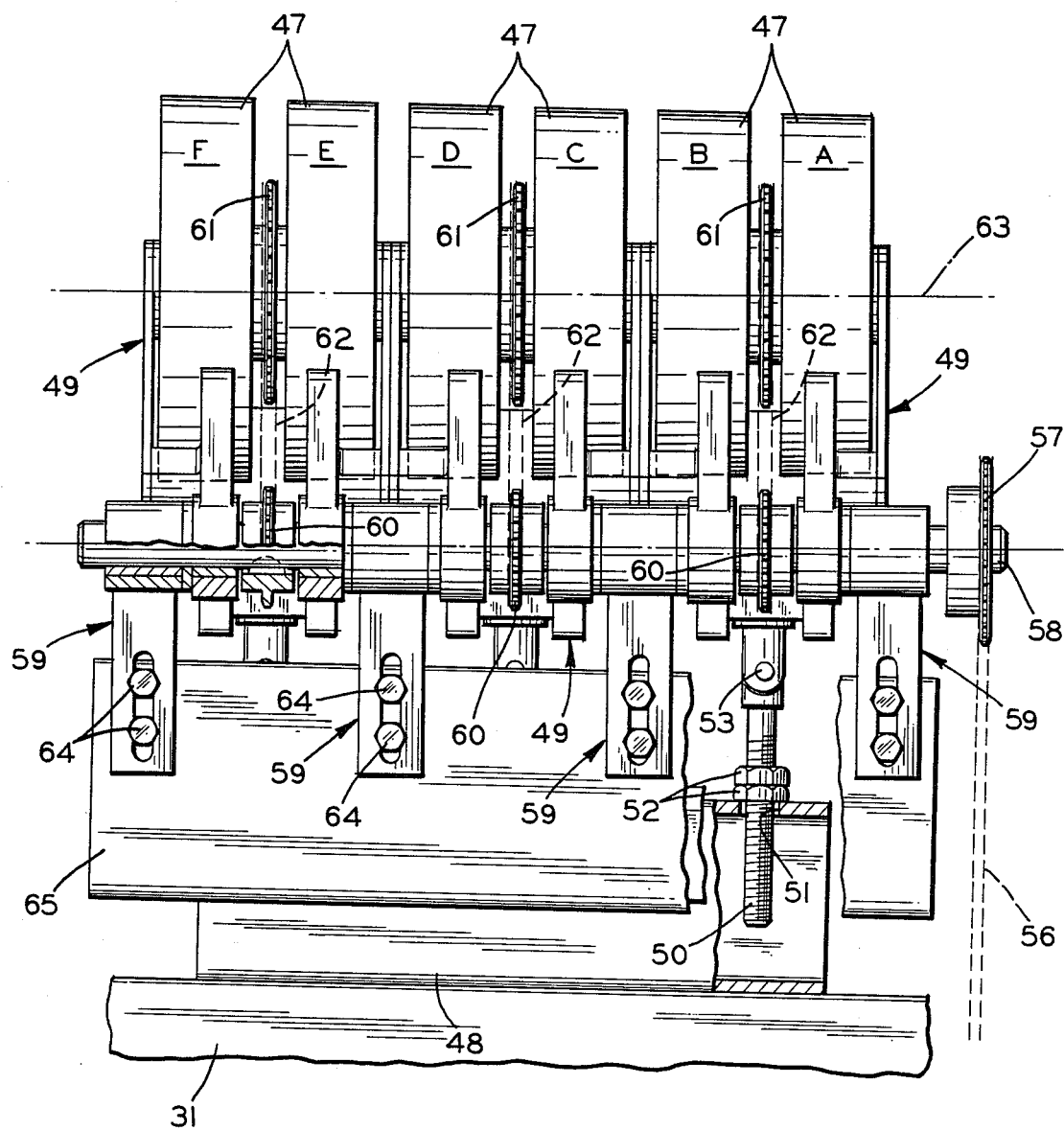
FIG. 4 is a rear elevational view of the prepressing apparatus as if taken along the line 4—4 of FIG. 3 and increased in scale.

The prepressing apparatus 10 is shown in greater detail in FIGS. 2 through 4. The prepressing apparatus 10 includes a frame 30 having a lower horizontal bed 31 and an upper horizontal arm 32 each having one end attached to a ground engaging upright post 33. The bed 31 and the arm 32 are in a spaced apart parallel relationship and the other end of the bed 31 is supported by a ground engaging leg 34.

Referring to FIGS. 2 and 3, the upper arm 32 supports a plurality of pairs of rubber prepress rollers 35. The rollers 35 are typically mounted in pairs with each pair being pivotally attached at the center of a cross-bar 36 having its ends supported between opposite ends of a generally C-shaped yoke 37. The yoke 37 is connected to one end of a vertically extending shaft 38 having its other end attached to a piston extension 39 of an air cylinder 40. The air cylinder 40 is mounted on a bracket 41 which is attached to the horizontal arm 32. Also mounted on the bracket 41 is a roller guide assembly 42 for positioning the shaft 38 for vertical movement between the upper position shown by the phantom lines 43 and the lower position shown by the solid lines in FIG. 3. The number and spacing of the prepress rollers 35 depend upon the width of the assembly 13 and the amount and distribution of the pressure to be applied to the assembly.

The assembly 13 is supported on top of a plurality of pairs of lower prepress or support rollers 44 which are similar in construction to the rollers 35. However, these rollers are not moveable, but are fixedly attached to brackets 45 and 46 which in turn are attached to the horizontal bed 31. Thus, the assembly 13 is supported by the lower prepress rollers 44 and pressure is applied by the upper prepress rollers 35 when they are lowered into position by the air cylinders 40. The brackets 45 and 46 are spaced apart along the horizontal bed 31 on opposite sides of a plurality of drive rollers 47. The drive rollers 47 are typically mounted in pairs on a box 48 attached to an upper surface of the horizontal bed 31. Each pair of the drive rollers 47 is rotatably supported by a bracket 49. The bracket 49 is attached to an upper end of a vertically extending threaded shaft 50 which extends through an aperture 51 in an upper surface of the box 48. A pair of stop nuts 52 are threaded onto the shaft 50 with a lower one of the nuts 52 engaging the upper surface of the box 48 and an upper one of the nuts 52 locking the lower nut in position on the shaft 50. The shaft 50 is pivotally connected to the bracket 49 at pivot point 53 for a purpose which will be explained below.

A motor and gear set 54 drives a sprocket 55 which in turn drives a roller chain 56 which is designated by a dashed line. The roller chain 56 in turn drives a sprocket 57 attached to one end of a drive shaft 58. The drive shaft 58 is rotatably supported by a plurality of adjustable slotted brackets 59 which are attached to the box 48. Attached to the shaft 58 for co-rotation therewith are a plurality of driven sprockets 50. Each of the driven sprockets 60 is associated with a pair of the drive rollers 47. Positioned between each pair of the rollers 47 is a sprocket 61 which is attached to the rollers 47 for co-rotation therewith. Each of the sprockets 60 drives an associated sprocket 61 with a chain 62.

In FIG. 4, the rollers 47 have been labeled from right to left with the letters "A" through "F". In accordance with the present invention, the rollers "A" through "F" are progressively larger in diameter and preferably are tapered to provide a frustum for the purpose of moving the assembly 13 through the prepress apparatus 10 in an arcuate path to the discharge position 24. Since the lower edge 16 of the assembly is longer than the upper edge 15, the roller "F" has a longer distance to travel than the roller "A" along the lower surface of the assembly 13. The different diameter rollers compensate for this difference in travel distance to prevent slippage and/or sliding between the lower surface of the assembly 13 and the drive surfaces of the rollers 47. Also, the arcuate path the assembly travels provides for more effectual pressing and prevents possible interference between the rollers and the vacuum ring 25 which can lead to the displacement thereof. In order to maintain a horizontal supporting surface for the transparent assembly 13, the axis of rotation 63 of the rollers 47 is tilted or angled with respect to horizontal with the drive roller "F" being at a lower point than the drive roller "A".

The tilting of the axis is accomplished by loosening a pair of threaded fasteners 64 which extend through elongated slots in each of the brackets 59 and are threaded into a backing plate 65. Loosening the fasteners 64 allows height adjustment on the brackets 59 and threading the stop nuts 52 in the desired direction allows the raising or lowering of the associated drive rollers 47. The drive rollers are pivoted at 53 such that the pivot points of all the drive rollers 47 can be aligned on the axis of rotation 63. The movement of the drive rollers 47 and the associated brackets 49 also causes the drive shaft 58 to be tilted such that its longitudinal axis remains parallel to the axis of rotation 63. Such movement is permitted by the adjustable brackets 59 and then the threaded fasteners 64 are tightened along with the stop nuts 52 to fix the entire assembly in place.

From the foregoing, it is apparent that the objects of this invention have been fully accomplished. As a result of this invention, an improved apparatus is produced for prepressing glass and plastic sheets for subsequent autoclaving and lamination in a mass production operation. It is to be understood that the form of the invention herein illustrated and described is to be taken as an illustrative embodiment, and that various changes in shapes, size, and arrangement of parts, as well as procedural changes, may be resorted to without departing from the spirit of the invention.

We claim:

1. A method of removing air from between the interfaces of an assembly of superimposed sheets, said assembly including a leading edge, a trailing edge and opposed side edges, comprising:

enclosing the leading, trailing and opposed side edges of superimposed sheets with a continuous evacuation ring, said evacuation ring extending beyond the surfaces of the assembly and having a thickness greater than the thickness of the superimposed sheets, said evacuation ring being in communication with the interfaces of said superimposed sheets and coupled to a vacuum source;

applying a vacuum to said ring to withdraw air therethrough;

providing a plurality of pairs of opposed rolls arranged in spaced apart relationship a distance greater than the thickness of said ring, the axes of rotation of opposed rolls lying in the same plane and the corresponding rolls of each pair having a common axis of rotation;

positioning the leading edge of said sheet assembly inwardly of said evacuation ring between said spaced apart opposed rolls with said leading edge being substantially parallel with the plane including axes of rotation of said opposed rolls, the number or pairs of opposed rolls providing a length measured along the axes of rotation of said opposed rolls less than the distance between the inner edges of said evacuation ring enclosing the opposed side edges;

effecting relative movement between said pairs of opposed rolls so that said opposed rolls enter into pressure engagement with opposite sides of said sheet assembly inwardly of said evacuation ring;

separating said opposed rolls a distance greater than the thickness of said ring, to release said pressure engagement on said sheet assembly; and removing said assembly from between said opposed rolls.

2. The method as claimed in 1, wherein said assembly comprises at least one bent glass sheet.

3. The method as claimed in 1, wherein said assembly comprises a bent glass sheet and a plastic laceration shield sheet.

4. The method as claimed in 1, wherein said assembly comprises two bent glass sheets, an interposed plastic interlayer sheet, and a plastic laceration shield sheet.

5. A method of removing air from between the interfaces of an assembly of superimposed sheets, said assembly including a leading edge, a trailing edge and opposed side edges, comprising:

enclosing the leading, trailing and opposed side edges of superimposed sheets with a continuous evacuation ring, said evacuation ring extending beyond the surfaces of the assembly and having a thickness greater than the thickness of the superimposed sheets, said evacuation ring being in communication with the interfaces of said superimposed sheets and coupled to a vacuum source;

applying a vacuum to said ring to withdraw air therethrough;

providing a plurality of pairs of opposed rolls arranged in spaced apart relationship a distance greater than the thickness of said ring, the axes of rotation of opposed rolls lying in the same plane and the corresponding rolls of each pair having a common axis of rotation;

positioning the leading edge of said sheet assembly inwardly of said evacuation ring between said spaced apart opposed rolls, the number of pairs of opposed rolls providing a length measured along the axes of rotation of said opposed rolls less than the distance between the inner edges of said evacuation ring enclosing the opposed side edges;

effecting relative movement between said pairs of opposed rolls so that said opposed rolls enter into pressure engagement with opposite sides of said sheet assembly inwardly of said evacuation ring;

advancing said assembly between said opposed rolls in an arcuate path while continuing to apply said vacuum to said evacuation ring until said ring at the trailing edge of said assembly is adjacent to but not yet in contact with said opposed rolls;

separating said opposed rolls a distance greater than the thickness of said ring, to release said pressure engagement on said sheet assembly; and removing said assembly from between said opposed rolls.

6. The method as claimed in claim 5, wherein said assembly comprises at least one bent glass sheet with differential lengths of its two side edges.

7. The method as claimed in claim 5, wherein said assembly comprises a bent glass sheet and a plastic laceration shield sheet in which said assembly has differential lengths of said two side edges.

8. The method as claimed in claim 5, wherein said assembly comprises two bent glass sheets, an interposed plastic interlayer sheet, and a plastic laceration shield sheet in which said assembly has differential lengths of said two side edges.

* * * * *